No. 627,254. Patented June 20, 1899.
L. CUNNINGHAM & H. M. BARNGROVER.
FRUIT GRADER.
(Application filed Nov. 27, 1897.)
(No Model.)
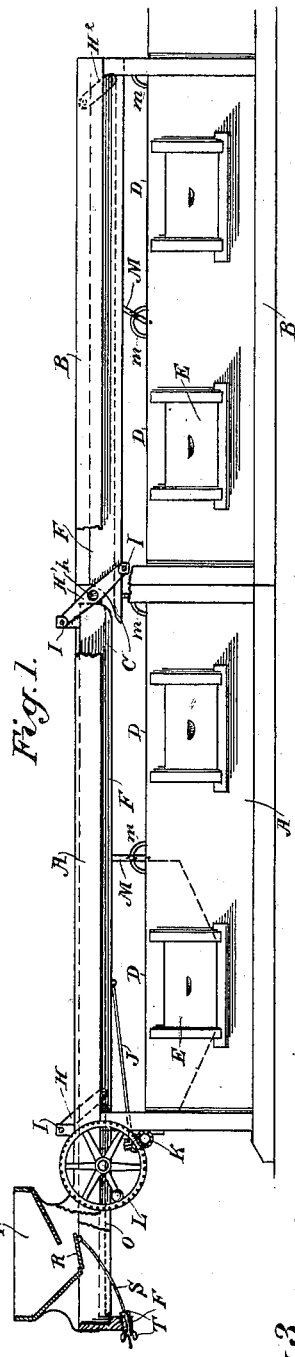
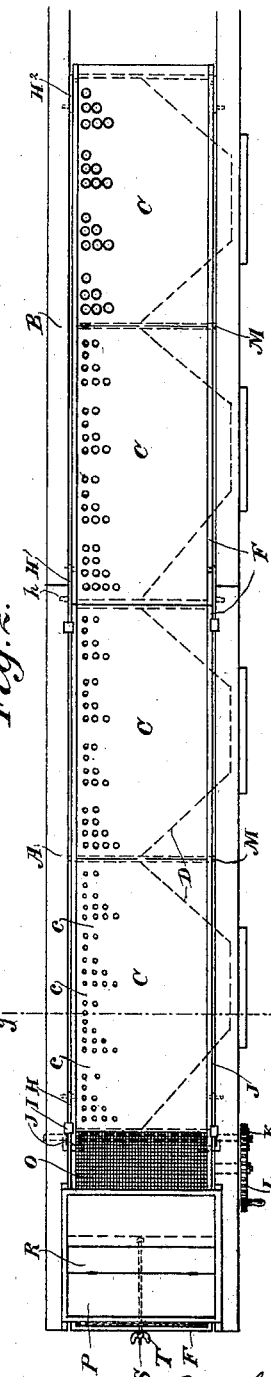
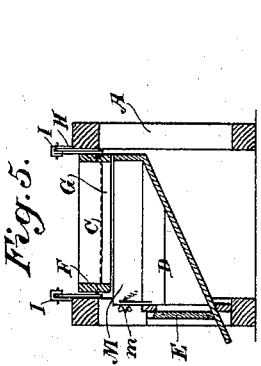
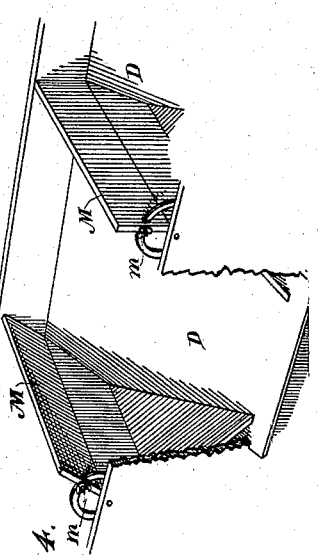
Witnesses,
Inventors,
Luther Cunningham
Harvey M. Barngrover
By Dewey & Co.
Attys

UNITED STATES PATENT OFFICE.

LUTHER CUNNINGHAM, OF SAN JOSÉ, AND HARVEY M. BARNGROVER, OF LOS GATOS, CALIFORNIA.

FRUIT-GRADER.

SPECIFICATION forming part of Letters Patent No. 627,254, dated June 20, 1899.

Application filed November 27, 1897. Serial No. 659,967. (No model.)

*To all whom it may concern:*

Be it known that we, LUTHER CUNNINGHAM, residing at San José, and HARVEY M. BARNGROVER, residing at Los Gatos, county of Santa Clara, State of California, citizens of the United States, have invented an Improvement in Fruit-Graders; and we hereby declare the following to be a full, clear, and exact description of the same.

Our invention relates to an apparatus which is especially designed for grading fruit, such as prune-plums, dried fruit, &c.

It consists in details of construction which will be more fully explained by reference to the accompanying drawings, in which—

Figure 1 is a side elevation. Fig. 2 is a plan view. Fig. 3 is a longitudinal section through the screen. Fig. 4 is a view of one of the chutes. Fig. 5 is a lateral section through the grader on line $y\,y$ of Fig. 2.

In the grading of fruit such as prune-plums or dried or other fruit it is customary to pass the fruit over screens, which are usually inclined and superposed, so that the fruit, being properly agitated thereon, will be separated, the smaller passing through the openings in the successive screens and being delivered into proper receptacles and the larger being retained upon the uppermost screens. In the trade it has been customary to grade this fruit—as, for instance, from forty to fifty to the pound forming one grade, fifty to sixty to the pound forming another grade, and so on to the smaller sizes, which require the greater number to the pound, and these various grades have different prices, depending upon the size and quality of the fruit.

It is difficult in many cases to so regulate the grade as to bring the fruit into the class where it should be, as a difference of a few of the smaller prunes passing into one compartment would throw the contents of that compartment into a grade really lower than they should occupy. A part of our invention relates to a means for so regulating the discharge as to enable the operator to produce the proper weight in each compartment during the process of grading. Another improvement is in the manner of suspending the screens and arranging them with relation to each other to counterbalance the oscillation and also in so constructing the supporting frames or cases that they may be used together or separately, as desired. Another difficulty which has been encountered in this class of work is caused by the sagging of the screens toward the center, which prevents the fruit from being evenly spread and distributed over the whole surface, and this we have also overcome. The feeding mechanism is so constructed as to produce a regulated discharge from the feed-hopper upon the screens.

A and B are separated and independent frames adapted to support the mechanism of the grading-screen C above, and they have the chutes D made within them below the screens adapted to receive any fruit falling through and retain it by means of sliding doors E until it is necessary to discharge or deliver it. In order that there may be an inspection of the grading, one side of the frames A B is left open, said open end also giving ready access to the turnable direction-boards, hereinafter described. These doors are here shown as slidable in vertical guides and closing down upon the lower end of the inclined chutes D, so that the fruit may be collected upon the chutes until it is desired to discharge it, when the doors may be opened to allow the discharge.

The screens are made in sections of any suitable or desired length and of a width to suit the required capacity of the machine, such as two and one-half feet or five feet, &c. These screens are fixed in frames F, across which they are secured, and they are perforated with holes increasing in size from the point where the fruit is first delivered upon them to the end where the discharge takes place, these varying sizes of holes allowing the smaller fruit to drop through first and the successively-larger grades through the larger openings as it proceeds from the receiving to the discharge end. The great difficulty with this class of apparatus has been to maintain the screens level, as the weight of the fruit upon them causes them to sag in the middle, and the tendency of the fruit is to settle along the central line, which prevents the full capacity of the screen being available.

In our invention we have made each screen with intermediate spaces, which are unperforated, as shown at c. We have here shown each screen thus subdivided into four sections by these intermediate unperforated portions, and transversely across the frame, beneath these unperforated portions, are fixed the angle-iron supports G, as shown in Fig. 3. These supports being thus placed at short intervals are sufficiently rigid to maintain the screen-surface level, thus insuring the proper distribution of the fruit over the whole surface and making it all available for grading purposes.

The screen-frames F are mounted upon the independent frames A and B and are suspended by links or hangers H, one of the sections being suspended in the frame A and the other in the frame B in such relation to each other that the first section slightly overlaps the second one, so that discharge may take place from one to the other and essentially in a continuous line. These sections are made essentially horizontal, as we do not desire to cause the fruit to proceed more rapidly by inclining the screens. The links H H' suspend the first screens in the first section, the upper ends being pivoted in fixed supports I upon the frame, and the screen-frame is connected by a rod or pitman J with a crank upon the pinion-shaft K, power being communicated to the latter by means of the gear-wheel L, so that any desired speed of oscillation may be had. We have found that about two hundred and fifty oscillations per minute, more or less, are very satisfactory for the purpose. The machinery may be turned by hand or any suitable or available power, and the oscillation of the first screen is communicated directly to the second one by extending the hangers H' at the discharge end of the first screen and connecting them with the second screen-frame below the pivot-point $h$, about which these hangers oscillate. At the discharge end of the second screen are hangers $H^2$, by which this end of the screen is suspended.

The operation will then be as follows: When the first screen, moved by the connecting-pitman J, is caused to advance and at the same time to rise by reason of the inclined position of the hangers H H', the hangers H' being pivoted, as shown at $h$, the lower end, projecting below the pivot-point, will act to draw the second screen toward the first one, depressing it at the same time, and, moving about its hangers H' and $H^2$, it is depressed when the first screen is raised and raised when the first one is depressed, the two moving at the same time in opposite directions and counterbalancing each other.

During the operations both screens are always maintained level by the simultaneous movement of the hangers. This causes the fruit to be advanced over each screen by a series of small jumps or impulses, and it is thus repeatedly raised and dropped upon the screen-surface until all that is small enough will have passed through the first screen, each grade passing through the holes which are of the proper size for it.

In certain classes of work—as for undried fruit, such as prunes—the first section will be sufficient for use. In that case the second section B of the frame is removed, the hanger H' remaining pivoted upon the first section, and it is only necessary to disengage the lower end of H' from the screen of the second section, when the whole frame of this section may be removed and stored away when not wanted. For dried fruit and when it is found preferable to use the two sections it is replaced, and they are connected together by bolts or other fastenings in line and the screens connected up, as previously described. The fruit then reaching the end of the first section will be discharged upon the second section, and as the movements of the two screens are in the opposite direction the effect will be to counterbalance the weight, and in operation the machine will be steadied and prevented from violent shaking, which might otherwise occur. This is an important feature in the construction.

As the fruit passes through the screens into the various compartments D it sometimes occurs that the fruit received in one compartment will not be quite up to the grade required by the various grades adopted in the trade, and in order to regulate this we have shown the swinging boards M fulcrumed across the frame beneath the trays and adapted to be turned to one side or the other, so that the fruit falling about in line with any one of these boards may be directed into either of the adjacent compartments. These boards are secured at any desired angle by means of clamping-screws $m$ and curved racks, with which they engage, so that if in any one compartment the size of the fruit is not quite up to the weight desired it is only necessary to turn the adjacent boards so as to direct the smaller fruit into the adjacent compartment and allow the larger fruit only to fall into the next compartment, thus bringing up the weight to the required standard.

O is the dirt-screen, upon which the fruit first passes from the feed-hopper P.

In order to insure a constant and even delivery of the fruit to the screens, we have shown a hinged flap R attached to the rear incline of the hopper-bottom P, and connecting with this is a rod S, the rear end of which is adjustably fixed to the end of the screen-frame, and it is provided with adjusting-nuts T, by which it may be set to increase or diminish the opening between the front of the flap R and the lower edge of the front incline of the hopper. When the apparatus is in motion, the hopper being supported from the main frame and the rod S connecting the flap with the oscillating screen-frame, the flap will thus be kept in constant agitation and will shake and loosen up the fruit and deliver it very regularly upon the screen, the advance being, as before stated, made by the constant oscillation of the screen.

Having thus described our invention, what we claim as new, and desire to secure by Letters Patent, is—

1. The combination of a plurality of separable frames disposed in line and provided with chutes, independent shaking-screens above the frames and having openings of progressively-increasing size, hangers pivotally suspending the outer ends of said frames, a hanger proximate to the inner ends of said screens, pivoted between its ends and having said ends connected with adjacent screen-frames, and means whereby the connection between said last-named hanger and one of the separable frames may be severed to disconnect the power devices from said section.

2. The combination of horizontal and independent frames, containing compartments for the graded fruit, said frames placed in line and each provided with a screen-frame and screen, a hanger disposed substantially in the vertical plane of the abutting ends of adjacent grading-frames, pivotally secured at its central portion, having one of its arms pivotally connected with one end of one of the shaking-screen frames and the opposite end detachably connected with the adjacent screen-frame whereby one of the grading-frames may be detached from the other without disturbing the operative parts of the latter, hangers pivotally suspending the outer ends of the screen-frames, and means whereby an oscillating motion is imparted to the screen-frames.

3. A frame having compartments for the graded fruit, and provided with a screen-frame and screens, said screens having openings of progressively-increasing diameter, a hanger pivotally suspending one end of said screen-frame, a hanger at the opposite end of the screen-frame, centrally pivoted and having arms extending in opposite directions, one of said arms pivotally connected with said screen-frame and the opposite arm adapted for the attachment of a second screen-frame, in combination with a second grading-frame adapted to be placed in line with the first-named grading-frame, and having a screen-frame to be detachably connected with the said opposite end of the centrally-pivoted hanger, and means whereby an oscillating movement is given the first-named screen-frame.

4. A fruit-grader comprising horizontal frames placed in line and provided with grading-compartments, said frames open at one side to enable the operation of grading to be inspected, a screen-frame and screen suspended above each horizontal frame, hangers pivotally suspending opposite ends of said screen-frames and means whereby one screen-frame may be detachably connected with the other without disturbing the action of the latter, means for oscillating the initial screen, hinged turnable direction-boards for each grading-compartment, exposed through the open sides of the horizontal frames, and curved racks passing through the boards and provided with clamping-screws for fixing the boards in their adjusted positions.

5. The combination with the main frame, a screen-frame, and a hopper supported on the main frame, of a hinged flap controlling the hopper-outlet, a rod connected with the free end of the hinged flap and having its outer end passing through the end of the screen-frame, and adjusting-nuts on the outer end of the rod for adjusting the position of said flap, said flap oscillating by reason of its connection with the oscillating screen-frame.

In witness whereof we have hereunto set our hands.

LUTHER CUNNINGHAM.
HARVEY M. BARNGROVER.

Witnesses:
H. W. WRIGHT,
W. J. EDWARDS.